Figure 1:
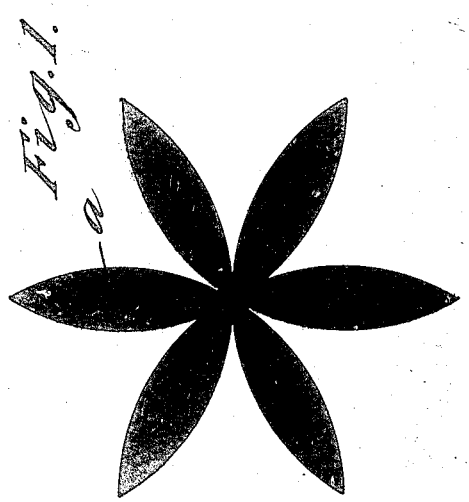

T. A. B. CARVER.
PICTURE OR DESIGN HAVING MOTION EFFECT.
APPLICATION FILED JULY 24, 1917.

1,398,838. Patented Nov. 29, 1921.
3 SHEETS—SHEET 1.

Witnesses

Inventor
Thomas A. B. Carver
by James L. Norris
Attorney

T. A. B. CARVER.
PICTURE OR DESIGN HAVING MOTION EFFECT.
APPLICATION FILED JULY 24, 1917.
1,398,838.
Patented Nov. 29, 1921.
3 SHEETS—SHEET 2.
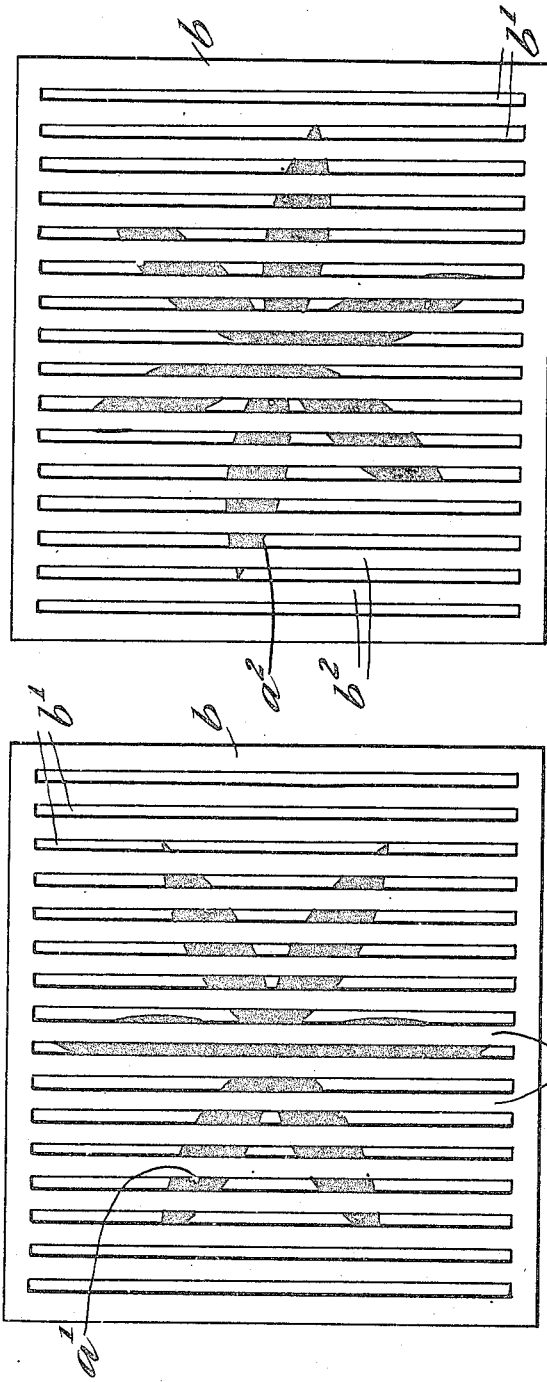
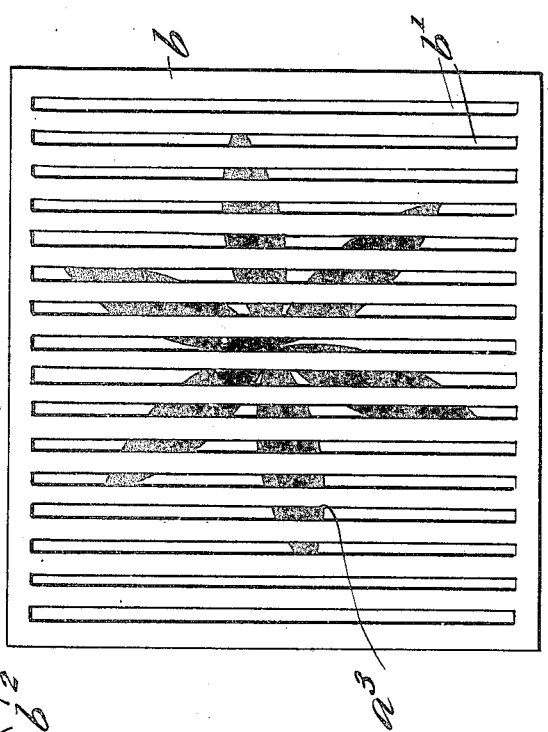
Inventor
Thomas A. B. Carver T. A. B. CARVER.
PICTURE OR DESIGN HAVING MOTION EFFECT.
APPLICATION FILED JULY 24, 1917.

1,398,838.

Patented Nov. 29, 1921.
3 SHEETS—SHEET 3.

Inventor
Thomas A. B. Carver
By
Attorney

UNITED STATES PATENT OFFICE.

THOMAS A. B. CARVER, OF GLASGOW, SCOTLAND.

PICTURE OR DESIGN HAVING MOTION EFFECT.

1,398,838.

Specification of Letters Patent.  Patented Nov. 29, 1921.

Application filed July 24, 1917. Serial No. 182,573.

*To all whom it may concern:*

Be it known that I, THOMAS ALBERT BRIGGS CARVER, a subject of the King of Great Britain, residing in Glasgow, Scotland, have invented certain new and useful Pictures or Designs Having Moving Effect, of which the following is a specification.

My invention relates to a method whereby an effect of movement can be obtained in a picture or design for use as an advertising sign or other visual indicator, when seen from a point of view that moves relatively to the picture.

To carry my invention into effect, I first select a picture or design for use and determine the number of phases through which the picture is to pass to produce an effect of movement, the number of phases being a chosen compromise between that giving the greatest amount of the picture seen at one time, and that giving the nearest effect of continuity of movement. I then construct a screen in a way to comprise a number of vertical obscuring bands with intervening open spaces or gaps, each gap being of a breadth that is a fraction of the center to center distance of the bands, the said fraction being proportional to the reciprocal of the selected number of phases. I next draw the picture or design in the selected number of phase or positions and cut each of the pictures so drawn so as to leave in each only a set or series of vertical strips each approximately as wide as a gap in the screen. The sets of vertical strips I mount on a support, the sets being laterally displaced relatively to one another, and, finally, I place the screen at an appropriate distance from the picture strips and between it and the point of view. Thereafter during a relative movement between the point of view and the picture strips in a direction transversely of the face of the screen, and while the screen and the series of picture strips remain relatively stationary, the selected picture or design will appear to an observer to have moving effect or animation.

I will further describe my invention with reference to the accompanying drawings and as applied to the movement of the simple geometric design shown therein, assuming, for example, that the movement is to be composed of three phases.

Figure 5:
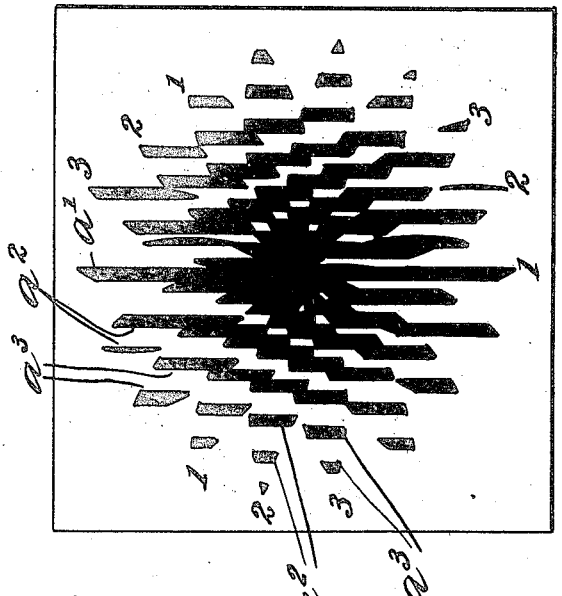
Figure 6:
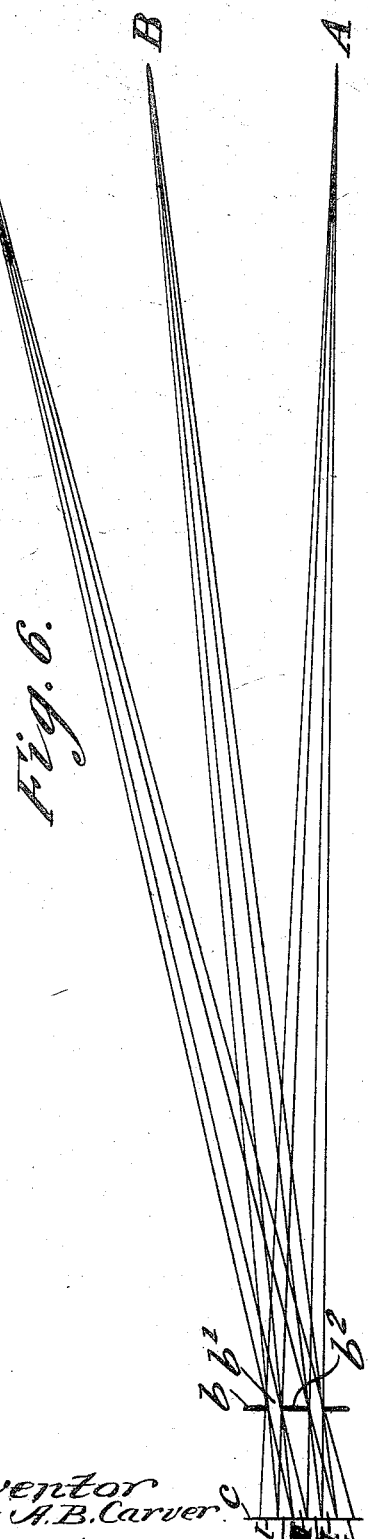
Figure 7:
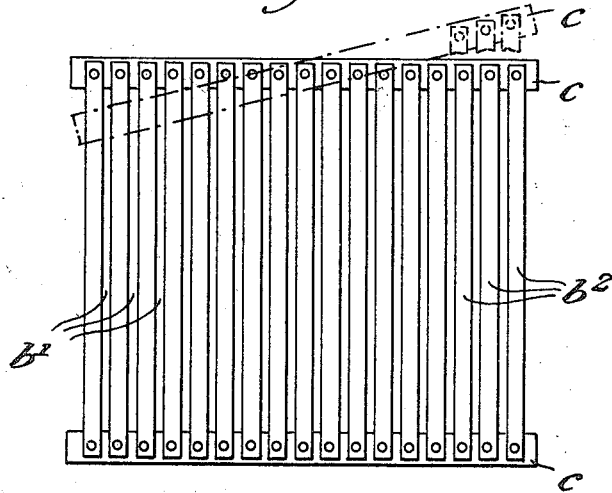

In the drawing, Figure 1 is an elevational view of the geometrical design just referred to; Fig. 2 is a like view of the design drawn in the first phase or position, the screen above alluded to being placed in front of and at a distance from it. Only strips of the design appear in the figure, the strips being constituted by parts of it that are seen through the gaps of the screen from a point of view in front of the screen; Fig. 3 is a like view of the design and screen, the design being drawn in or turned into the second phase or position, only those parts or strips of the design appearing as are seen from a second point of view in front of the screen; Fig. 4 is a like view of the design and screen, the design being turned farther around or drawn in the third phase or position, only those parts or strips of the design appearing as are seen from a third point of view in front of screen; Fig. 5 is a picture made up of the several sets of strips of the design appearing in Figs. 2, 3 and 4, the strips of one set being displaced laterally with respect to the strips of another set by the width of a gap on the screen; Fig. 6 is a part plan showing the relative positions of the picture, the screen and a series of points of view according to one arrangement for carrying out the invention; and Fig. 7 is a front elevation of a screen constructed so as to be able to adjust the positions of the vertical obscuring bands.

Having drawn the figure or design $a$, Fig. 1, in each of the three phases, Nos. I, II, III, which go to compose an approximately uniform movement, I cut the picture of each phase of the design so as to leave only vertical strips or sections $a'$, $a^2$, $a^3$ approximately as wide as the gaps $b'$ between the obscuring bands $b^2$ of the screen $b$, Figs. 2—4, and at a center to center distance, approximately the same as the center to center distance of the obscuring bands $b^2$. In the example illustrated the gaps $b'$ are one-third of the center to center distance, or half the breadth, of the bands $b^2$. Taking the first phase, or phase I, Fig. 2, I mount the vertical sections $a'$ thereof on a support $c$, Fig. 6, placed at a short distance behind the screen $b$ in such a way that when viewed through the screen from a distance, for instance position A, Fig. 6, the vertical sections $a'$ are seen to completely fill the gaps $b'$ between the vertical bands $b^2$ of the screen and give an effect approximating to the complete picture of phase I shown in Fig. 3. I then mount the vertical sections $a^2$ of phase II on the same support, but each arranged with respect to sections $a'$ of phase I at a distance to the left approximately equal to the width of a gap $b'$ in the screen, as shown in Fig. 5, so that when the view point is correctly changed, say from position A to position B, the approximately complete picture of phase II will be seen through the gaps between the bands of the screen, as shown in Fig. 3, just as from the first point of view A the approximately complete picture was seen in phase I. Thus from the first point of view, A, Fig. 6, the vertical sections $a'$ of phase I are seen through the gaps of the screen $b$, and when the view point is changed to B, the vertical sections $a^2$ of phase II are seen through the gaps in the screen.

I perform exactly the same operation with the picture of phase III, so that from a third point of view C an approximately complete picture in phase III, as shown in Fig. 4, will be seen through the gaps of the screen. When the change of the point of view is of a proper rate the quick succession to view of the picture in its three phases gives the effect of movement.

While I have, for example, assumed that the picture may be divided into three phases, other numbers of phases may be employed, but the width of the gap between the obscuring portions of the screen should always be proportional to the reciprocal of the number of phases, subject, however, to the following correction. As the method entails placing the picture at a distance behind the screen, the picture when seen through the screen should be wider from left to right than the gaps $b'$ between the obscuring portions $b^2$ of the screen $b$, on account of the lines drawn from the eye to the two ends from left to right of the picture including an angle between them. It is easy to give effect to this correction when all the factors are known, that is, when the width of a gap $b'$, the distance between the view point and the screen $b$, and the distance between screen and picture are known, because the width of the vertical sections or strips of the picture should be greater than the gaps between the obscuring portions or bands of the screen in the same ratio as the distance between the view point and the picture is greater than the distance between the view point and the screen, the same of course applying to the center to center distances of the vertical strips or portions of the picture.

In the construction of an apparatus where the factors are known, this correction can be made, but to give effect approximately to this correction within reasonable limits, in cases where the factors may not be exactly known beforehand, I can construct the screen as shown in Fig. 7, so that the vertical obscuring bands $b^2$ are not fixed, but are adjustable by connecting them with links $o$, for example, on the principle of the parallel rule, whereby the bands can be spaced nearer or farther apart. I may also construct the picture in the same way, the object in both cases of course being to bring the vertical portions of each phase of the picture into correct register with the gaps between the obscuring portions of the screen when viewed from the chosen distance.

It is obvious that the same effect of movement, as described, will be obtained when the complete apparatus is mounted on a moving platform or object while the point of view remains stationary, producing a relative movement of the point of view.

Having thus described my invention and the best means I know of carrying the same into practical effect, I claim:

1. The herein described method of endowing a picture or design with an effect of movement when seen from a point of view that is in front thereof and moves relatively to the picture or design which consists in preparing a predetermined number of copies of one and the same picture or design but each copy in a different position or phase, cutting the several copies into vertical strips and discarding alternate strips of each copy, assembling the remaining strips of the several copies on a suitable surface in such manner that the strips of each copy are laterally displaced with respect to the strips of the other copies, and interposing between the point of view and the strip carrying surface a screen comprising a number of vertically disposed obscuring bands of equal width and equal pitch alternating with clear spaces each of a width proportional to the reciprocal of the number of phases in which the picture or design is prepared, the strips assembled on the supporting surface being not less in width than the clear spaces of the screen and being assembled with a pitch not less than that of the obscuring bands of the screen.

2. For the production of a picture or design having moving effect when seen from a point of view that is in front thereof and moves relatively to the picture, apparatus comprising in combination a screen consisting of a number of vertical obscuring bands with intervening open gaps, each gap being of a breadth that is a fraction of the center to center distance of the bands, said fraction being proportional to the reciprocal of the selected number of phases through which the picture is to pass to produce the moving effect, a stationary support arranged separately from and at a distance in rear of the screen, a predetermined number of copies of the picture, each copy drawn in a different phase and consisting of a set of vertical strips spaced apart, each strip having a breadth not less than the width of the said gaps and a center to center distance not less than the first mentioned center to center distance, the said sets of strips being mounted on the support and laterally displaced one set relatively to another set, substantially as described.

3. For the production of a picture or design having moving effect when seen from a point of view that is in front thereof and moves relatively to the picture, apparatus comprising in combination a screen consisting of a number of vertical obscuring bands with intervening open gaps, each gap being of a breadth that is a fraction of the center to center distance of the bands, said fraction being proportional to the reciprocal of the selected number of phases through which the picture is to pass to produce the moving effect, a stationary support arranged separately from and at a distance in rear of the screen, a predetermined number of copies of the picture, each copy drawn in a different phase and consisting of a set of vertical strips spaced apart, each strip having a breadth not less than the width of the said gaps and a center to center distance not less than the first mentioned center to center distance, the breadth and center to center distance of the strip being greater than the said width and the first said center to center distance respectively in the same ratio as the distance between the view point and the picture is greater than the distance between the view point and the screen, the center to center distance of the vertical strips being greater than the center to center distance of the bands, the said sets of strips being mounted on the support and laterally displaced one set relatively to another set, substantially as described.

4. For the production of a picture or design having moving effect when seen from a point of view that is in front thereof, and moves relatively to the picture, apparatus comprising in combination a screen consisting of number of laterally adjustable vertical obscuring bands with intervening open gaps, each gap being of a breadth that is a fraction of the center to center distance of the bands, said fraction being proportional to the reciprocal of the selected number of phases through which the picture is to pass to produce the moving effect, a stationary support arranged separately from and at a distance in rear of the screen, a predetermined number of copies of the picture, each copy drawn in a different phase and consisting of a set of vertical strips spaced apart, each strip having a breadth greater than the width of the said gaps and a center to center distance greater than the first mentioned center to center distance, the said sets of strips being adjustably mounted on the support and laterally displaced one set relatively to another set, and means for shifting the vertical obscuring bands so as to vary the gaps between them, and means for shifting the vertical picture strips to vary the distance between them, substantially as described.

In testimony whereof I have signed my name to this specification in the presence of two subscribing witnesses.

THOMAS A. B. CARVER.

Witnesses:
WILLIAM KERZ,
A. J. MARSHALL.